(12) United States Patent
Cromie

(10) Patent No.: US 11,897,593 B2
(45) Date of Patent: Feb. 13, 2024

(54) TELESCOPING SUPPORT STRUCTURE

(71) Applicant: Aerostar International, LLC, Columbia, MD (US)

(72) Inventor: John Cromie, Menlo Park, CA (US)

(73) Assignee: Aerostar International, LLC, Sioux Falls, SD (US)

( * ) Notice: Subject to any disclaimer, the term of this patent is extended or adjusted under 35 U.S.C. 154(b) by 927 days.

(21) Appl. No.: 16/888,999

(22) Filed: Jun. 1, 2020

(65) Prior Publication Data
US 2020/0331580 A1  Oct. 22, 2020

Related U.S. Application Data

(63) Continuation of application No. 15/843,116, filed on Dec. 15, 2017, now Pat. No. 10,717,510.

(51) Int. Cl.
  *B64B 1/40* (2006.01)
  *H04W 84/06* (2009.01)
  *B66D 5/02* (2006.01)

(52) U.S. Cl.
  CPC ............ *B64B 1/40* (2013.01); *B66D 5/02* (2013.01); *H04W 84/06* (2013.01)

(58) Field of Classification Search
  CPC ............ B64B 1/40; B66D 5/02; H04W 84/06
  See application file for complete search history.

(56) References Cited

U.S. PATENT DOCUMENTS

| | | | |
|---|---|---|---|
| 2,680,577 A | 6/1954 | Frieder et al. | |
| 3,037,805 A | 6/1962 | Ted et al. | |
| 4,737,133 A * | 4/1988 | Neumeier | G08B 5/00 446/222 |
| 5,080,302 A * | 1/1992 | Hoke | B64B 1/50 244/33 |
| 7,410,151 B2 | 8/2008 | Haeupl et al. | |

(Continued)

FOREIGN PATENT DOCUMENTS

FR  2408520 B1  12/1982

OTHER PUBLICATIONS

Dragon, Plate , "Carbon Fiber Telescoping Tubes", Available at <https://dragonplate.com/ecart/categories.asp?cID=144>, downloaded from Internet on Nov. 27, 2017, 3 pages.

(Continued)

*Primary Examiner* — Rodney A Bonnette
(74) *Attorney, Agent, or Firm* — Kim and Lahey Law Firm, LLC; Douglas W. Kim

(57) ABSTRACT

The technology relates to a telescoping support structure which can be suspended between two objects. The telescoping support structure uses projections between adjacent tubular sections in order to prevent the adjacent tubular sections from falling away from one another. Although the telescoping support structure may be utilized in various different environments and circumstances, it may be of particular usefulness in the field of high-altitude ballooning. For instance, when used in a balloon system, the telescoping support structure may be suspended between two objects such as an upper payload structure and a lower payload structure. As another example, the telescoping support structure may be suspended between a balloon envelope and a payload which, in some examples, may include an upper and a lower payload structure.

18 Claims, 11 Drawing Sheets

(56) References Cited

U.S. PATENT DOCUMENTS

| | | | |
|---|---|---|---|
| 9,266,598 B1 | 2/2016 | Devaul | |
| 9,580,161 B1 * | 2/2017 | Roach | B64B 1/40 |
| 9,663,214 B2 | 5/2017 | Guetta et al. | |
| 9,745,040 B1 | 8/2017 | Hall-Snyder et al. | |
| 9,908,609 B1 | 3/2018 | Fourie | |
| 10,035,576 B1 * | 7/2018 | Brookes | B64B 1/40 |
| 10,717,510 B2 | 7/2020 | Cromie | |
| 2004/0033870 A1 | 2/2004 | Haupl et al. | |
| 2014/0054412 A1 | 2/2014 | Guetta et al. | |
| 2017/0081011 A1 | 3/2017 | Matthews et al. | |
| 2017/0194081 A1 | 7/2017 | Boday et al. | |
| 2019/0185126 A1 | 6/2019 | Cromie | |

OTHER PUBLICATIONS

"U.S. Appl. No. 15/843,116, Non-Final Office Action dated Oct. 2, 2019", 17 pgs.

"U.S. Appl. No. 15/843,116, Response filed Dec. 17, 2019 to Non-Final Office Action dated Oct. 2, 2019", 20 pgs.

"U.S. Appl. No. 15/843,116, Examiner Interview Summary dated Dec. 23, 2019", 8 pgs.

"U.S. Appl. No. 15/843,116, Notice of Allowance dated Mar. 3, 2020", 10 pgs.

"U.S. Appl. No. 15/843,116, 312 Amendment filed Mar. 11, 2020", 5 pgs.

"U.S. Appl. No. 15/843,116, PTO Response to Rule 312 Communication dated Mar. 26, 2020", 2 pgs.

* cited by examiner

TELESCOPING SUPPORT STRUCTURE

CROSS REFERENCE TO RELATED APPLICATIONS

The present application is a continuation of U.S. patent application Ser. No. 15/843,116, filed Dec. 15, 2017, the entire disclosure of which is incorporated by reference herein.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network. However, the size of the balloons, payloads and connections there between required to provide such access, can become quite large, reaching 50 meters or more or less. This can create logistical issues as well as difficulties prior to and during launch of these balloons.

BRIEF SUMMARY

One aspect of the disclosure provides a system comprising a telescoping support structure. The telescoping support structure includes a first terminal tubular section including a first terminal feature at a first end of the first terminal tubular section and an interior projection at a second end of the first terminal tubular section, the first end of the first terminal tubular section being opposite of the second end of the first terminal tubular section; a second terminal tubular section including a second terminal feature at a second end of the second terminal tubular section and an exterior projection at a second end of the second terminal tubular section, the first end of the second terminal tubular section being opposite of the second end of the second terminal tubular section; and one or more intermediate tubular sections arranged between the first terminal tubular section and the second terminal tubular section, each given one of the one or more intermediate tubular sections including a respective first projection on an exterior surface of the given one and a respective second projection on an interior surface of the given one. The interior projection is configured to engage with a respective first projection of one of the one or more intermediate tubular sections and the exterior projection is configured to engage with a respective second projection of the one or more intermediate tubular sections.

In one example, the system also includes a balloon envelope and a payload, wherein the telescoping support structure is arranged between the balloon envelope and the payload. In another example, the system also includes a balloon envelope and a payload including upper payload structure and a lower payload structure. In this example, the telescoping support structure is arranged between the upper payload structure and the lower payload structure. In another example, each respective first projection is configured in a wedge-shape having a predetermined angle to facilitate engagement of that first projection with another projection. In another example, each respective second projection is configured in a wedge-shape having a predetermined angle to facilitate engagement of the first projection with another projection. In another example, the respective first projection of the given one is formed from a same material as the given one. In another example, the respective first projection of the given one is integral to the exterior surface of the given one. In another example, the respective first projection of the given one is attached to the exterior surface of the given one using an epoxy material. In another example, the respective second projection of the given one is integral to the interior surface of the given one. In another example, the respective second projection of the given one is attached to the interior surface of the given one using an epoxy material.

In another example, the first terminal feature includes a spool of cable, the second terminal feature includes a connection, and the system further includes cable connecting the spool and the connection. In this example, the first terminal feature also includes a damper mechanism configured to limit rotation of the cable and thereby limit release of the cable when the telescoping support structure is being deployed. In addition, the damper mechanism is a passive damper which produces torque in response to rotation of the spool. Alternatively, the damper mechanism is an active damper which includes a motor. In addition or alternatively, the first terminal feature also includes a restraint device configured to retrain at least some of the cable on the spool prior when the telescoping support structure is in a stowed condition. In addition or alternatively, the restraint device also includes a wire configured to restrain at least some of the cable on the spool prior when the telescoping support structure is in the stowed condition. In this example, the restraint device also includes an activation device configured, when activated, to cut the wire and allow the spool to release the at least some of the cable from the spool when the telescoping support structure is being deployed. In addition, the system also includes a balloon wherein the activation device is configured to be activated when the balloon reaches a predetermined altitude. In another example, at least one of the one or more intermediate tubular sections includes a flexure section configured to absorb bending stresses between the first terminal tubular section and the second terminal tubular section. In another example, the respective second projection of the given one includes a tooth structure configured to limit rotation of an adjacent tubular section when the telescoping support structure is in a fully deployed condition.

DETAILED DESCRIPTION

Overview

Figure 1:
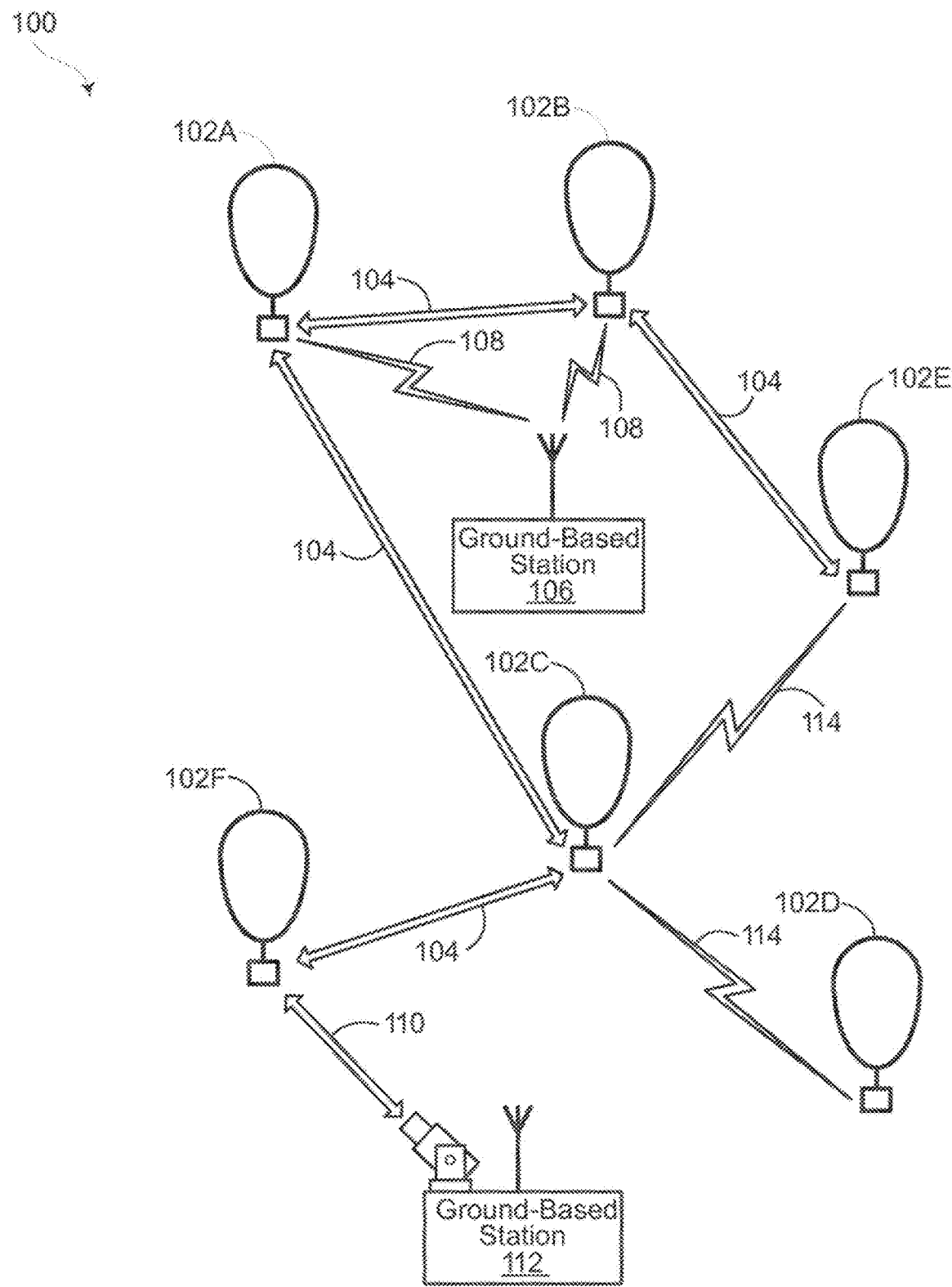
FIG. 1 is a functional diagram of a network in accordance with aspects of the disclosure.

The technology relates to a telescoping support structure which can be suspended between two objects. Although the telescoping support structure may be utilized in various different environments and circumstances, it may be of particular usefulness in the field of high-altitude ballooning. For instance, when used in a balloon system, the telescoping support structure may be suspended between two objects such as an upper payload structure and a lower payload structure. As another example, the telescoping support structure may be suspended between a balloon envelope and a payload which, in some examples, may include an upper and a lower payload structure.

The telescoping support structure may include a plurality of tubular sections. Each tubular section may include an opening at one end which extends through the length of the tubular section to the opposite end. The telescoping support structure may include a first terminal tubular section, one or more intermediate sections, and a second terminal tubular section. The first ends of the intermediate tubular sections and one of the terminal tubular sections may include a first projection and the second ends of the intermediate tubular sections and the other of the terminal tubular sections may include a second projection. These first and second projections may be configured to engage with one another in order to prevent the tubular sections from completely sliding through one another.

The first and second projections may each form a wedge shape which extends directly from the interior or exterior surfaces of the respective tubular section, and in other words, be a part of the respective tubular section. Thus, the second projection may be made of the same material as the tubular section. Alternatively, rather than being an integral part of a tubular section, the first and second projections may be formed as a separate ring attached to the exterior surface of the tubular section.

The terminal ends of the telescoping support structure may each include a terminal feature. One terminal feature may include a spool with attached cable, a restraint device, a damper mechanism, and an opening for passing electrical and/or power cables through the interior of the telescoping support structure. The damper mechanism may allow the cable to be released by the spool at a controlled rate when the telescoping support structure is initially deployed. The restraint device may prevent the spool from releasing the cable prior to a desired point in time. Another terminal feature may include a connection for attaching the cable as well as an opening for passing electrical and/or power cable through the interior of the telescoping support structure.

In some examples, it may be useful to allow for some degree of freedom between the tubular sections and within the telescoping support structure. This may allow the telescoping support structure to absorb at least some bending stresses between the first object and the second object rather than simply transferring the stress between the first and second objects like a beam. In one example, one, more than one, or all of the intermediate tubular sections may include one or more flexure sections. In addition or as an alternative to a flexure section, the second projection may have an at least partially spherical or rounded shape.

The telescoping support structure may also be assembled and deployed easily and efficiently. In order to assemble the telescoping support structure, a plurality of tubular sections may be inserted into one another. The terminal features may be attached to the ends of the terminal tubular sections. Cable from one of the terminal features may be attached to a connection on the other terminal feature. Once the telescoping support structure is assembled, electrical and/or power cables may be placed within the telescoping support structure via an opening at one of the terminal features. Before or after placing and attaching the electrical and/or power cable, the telescoping support structure may be attached to first and second objects. In order to deploy the telescoping support structure, the spool may be released from one of the terminal features and allowed to rotate against the damper. The tubular sections will begin to deploy by sliding one or more tubular sections through adjacent tubular sections until the telescoping support structure is fully deployed.

The features described herein may allow for compact storage of the telescoping support structure allowing for easy transport and assembly. The telescoping support structures allows for a mechanical connection between two objects which can be deployed from an initial distance to a final distance, where that initial distance is meaningfully shorter than the final distance. In this regard, a compact configuration prior to launch may be beneficial for launch logistics for balloon systems. In addition, the deployment of the telescoping support structure may be effected in a straightforward and simple way which relies on gravity. All of these benefits are especially important to high-high altitude ballooning.

Example Balloon Network

FIG. 1 depicts an example network 100 in which a balloon as described above may be used. This example should not be considered as limiting the scope of the disclosure or usefulness of the features of the films and balloon envelopes as described herein. For example, the films may be employed on various types of balloons, such as balloons carrying telescopes, surveillance gear, weather sensors or other types of standalone balloons or balloons used with other types of systems. In this example, network 100 may be considered a "balloon network." The balloon network 100 includes a plurality of devices, such as balloons 102A-F, ground based stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
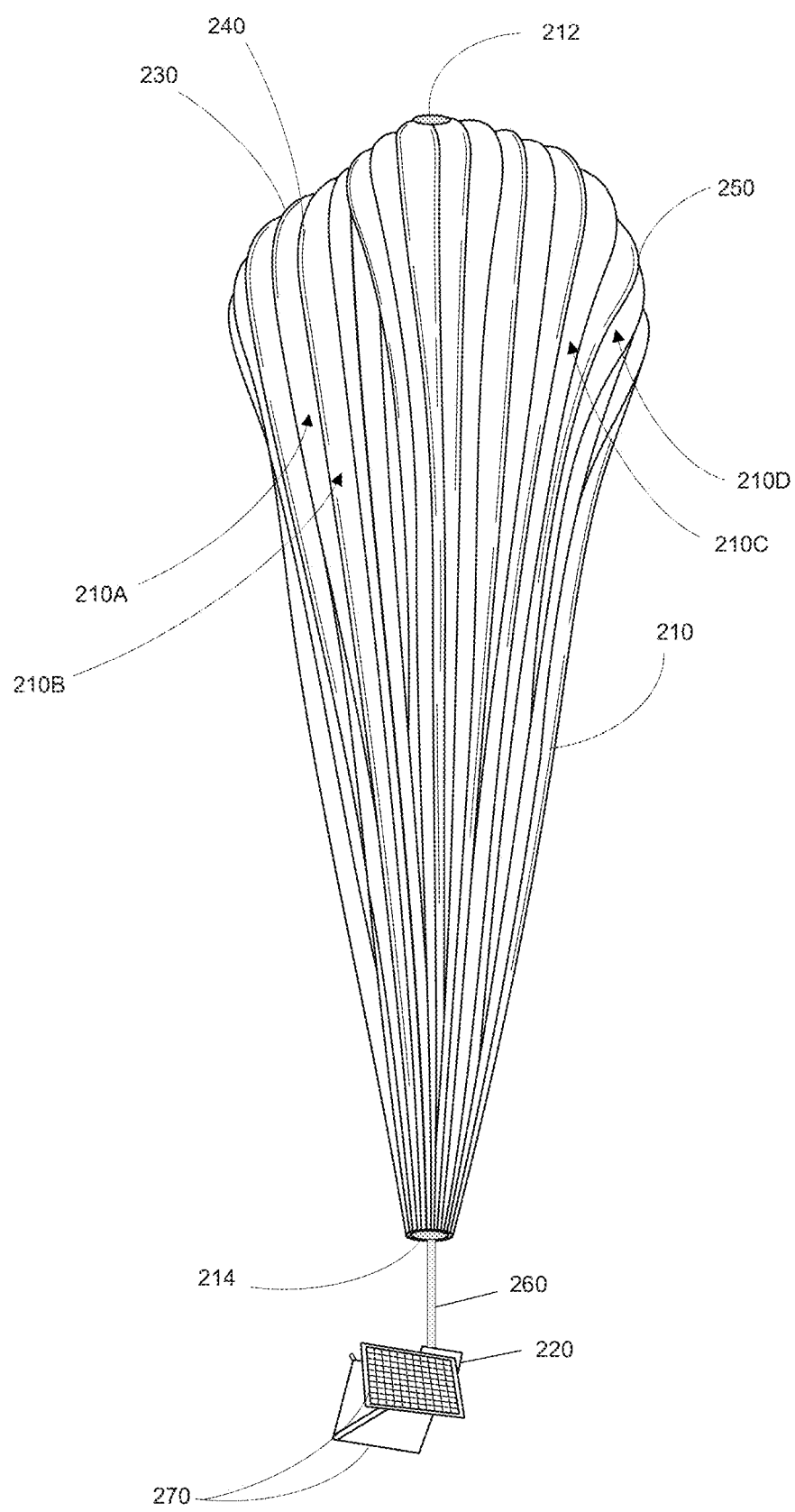
FIG. 2 is an example of a balloon in accordance with aspects of the disclosure.

FIG. 2 is an example stratospheric balloon 200, which may represent any of the balloons of balloon network 100. In this example, balloon envelope 210 may be inflated to a desired level, but not yet pressurized. In other words, FIG. 2 depicts the balloon envelope 210 inflated with lift gas close to ground level, for instance, at atmospheric pressure. As the balloon rises and the atmospheric pressure drops, the lift gas within the balloon envelope expands, changing the shape of the balloon envelope. Eventually, for instance, when the balloon envelope reaches the stratosphere, the lift gas in the balloon envelope causes the balloon envelope to form more of a rounded pumpkin shape depicted in FIG. 3.

As shown, the balloon 200 includes a balloon envelope 210, a payload 220 and a plurality of tendons 230, 240 and 250 attached to the balloon envelope 210. The balloon envelope 210 may take various forms. In one instance, the balloon envelope 210 may be constructed from materials such as polyethylene that do not hold much load while the balloon 200 is floating in the air during flight. Further, the volume of the balloon envelope may be on the order of 2000 cubic meters. However, the shape and size of the balloon envelope 210 may vary depending upon the particular implementation. Additionally, the balloon envelope 210 may be filled with various gases or mixtures thereof, such as helium, hydrogen or any other lighter-than-air gas. The balloon envelope 210 is thus arranged to have an associated upward buoyancy force during deployment of the payload 220.

Figure 3:
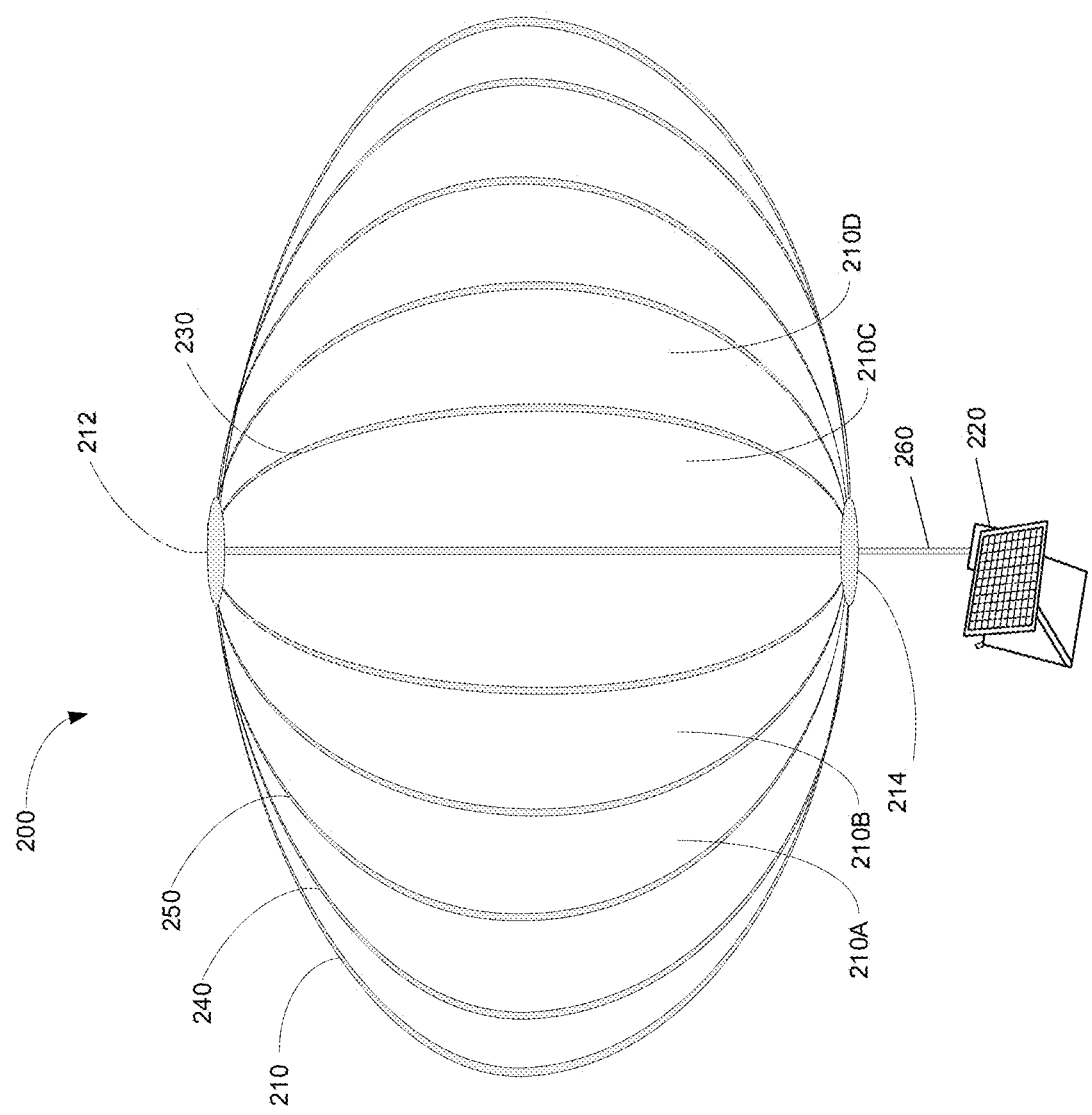
FIG. 3 is another example of the balloon of FIG. 2.

The plurality of tendons may extend between a top plate system 212 arranged at an apex of the balloon envelope and a base plate system 214 arranged at the base on the balloon envelope. Pressurized lift gas within the balloon envelope 210 may cause a force or load to be applied to the balloon 200. In that regard, the tendons 230-250 provide strength to the balloon 200 to carrier the load created by the pressurized gas within the balloon envelope 210. As shown more clearly in FIG. 3, depicting the balloon envelope 210 as being pressurized (for instance, in a nominal condition when floating in the stratosphere), the tendons are arranged along a centerline of each of the gores 210A-210B. Alternatively, the tendons may be arranged at the seams between the gores. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using a type of plate, such as top plate system 212 positioned at the apex of balloon envelope 210. Bottom ends of the tendons 230, 240 and 250 may also be connected to one another. For example, a corresponding plate, for instance, a base plate system 214, is disposed at a base or bottom of the balloon envelope 210. The top plate system 212 at the apex may be the same size and shape as and base plate system 214 at the bottom. Both plate systems include corresponding components for attaching the tendons 230, 240 and 250. In some examples, the top plate system 212 may serve a mounting point for certain systems attached to the balloon 200.

The payload 220 of balloon 200 may be affixed to the balloon envelope at the base plate system 214 by a telescoping support structure 260 as discussed further below. The payload 220 may include one or more solar panels 270 and a computer system (not shown) housed within the payload. The computing system may have one or more processors and on-board data storage. The payload 220 may also include various other types of equipment and systems (not shown) to provide a number of different functions. For example, the payload 220 may include an optical or radio communication system, a navigation system, a positioning system, a lighting system, an altitude control system and a power supply to supply power to various components of balloon 200.

Figure 4:
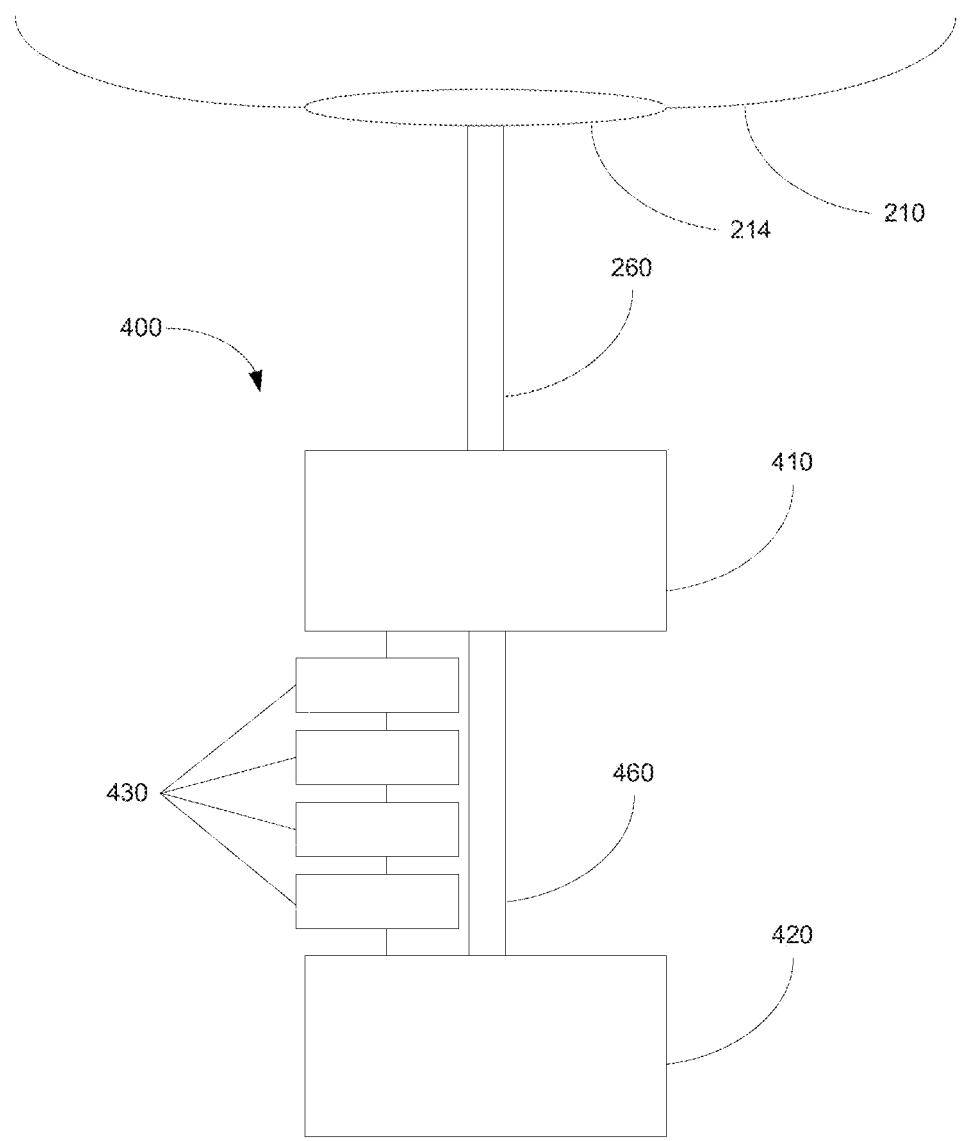
FIG. 4 is an example view of a payload and in accordance with aspects of the disclosure.

A payload may take may be configured in various ways. For instance, as shown in the example of FIG. 4, a payload 400 may include an upper payload structure 410, a lower payload structure 420, and a plurality of solar panels 430 arranged between the upper payload structure 410 and the lower payload structure 420. Although shown as being suspended between the payloads, the solar panels may be arranged at different locations, including for instance at the upper payload structure or lower payload structure. A telescoping support structure 460 may be affixed to the upper payload structure and the lower payload structure in order to support the weight of the lower payload structure 420, and in some cases, also to support the solar panels 430 if arranged below the lower payload structure.

In other aspects, payload 400 may be comparable to payload 220, may be attached to balloon envelope 210, and may thus include the same components as payload 220 such as a computer system as well as other equipment and system as noted above. In that regard, payload 400 may be affixed to the balloon envelope via a telescoping tube system.

Example Telescoping Support Structure

Figure 5:
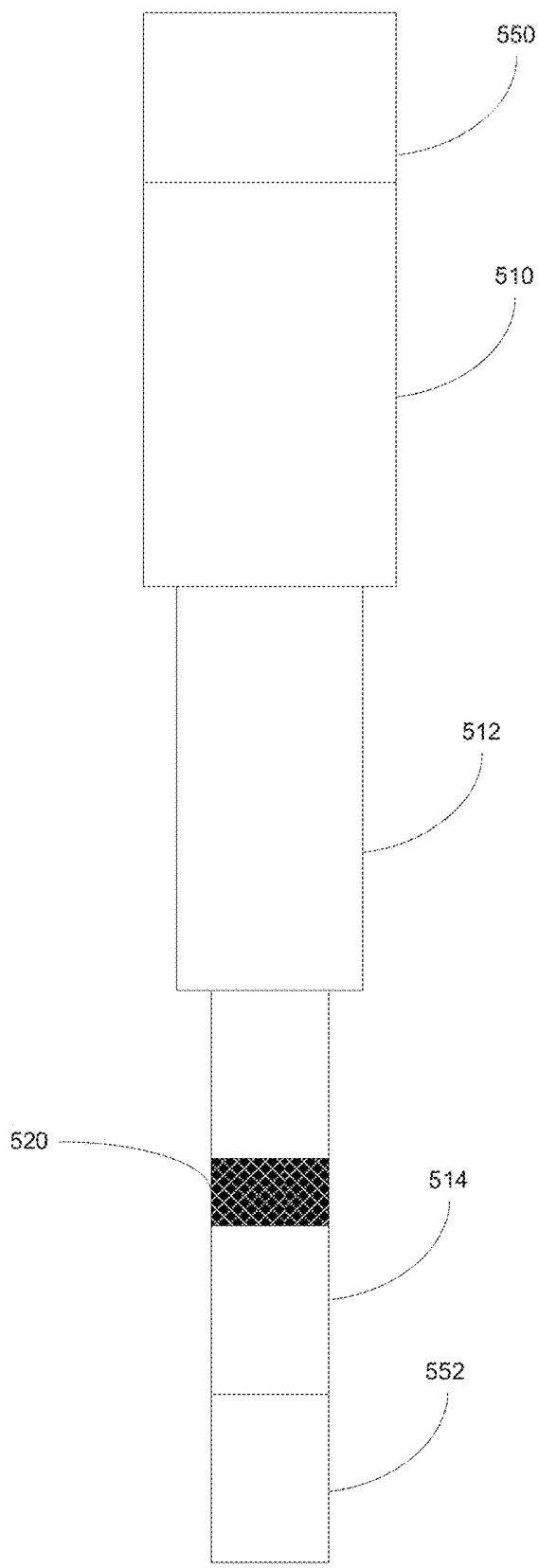
FIG. 5 is a perspective view of a telescoping support structure in a fully deployed condition in accordance with aspects of the disclosure.
Figure 6:
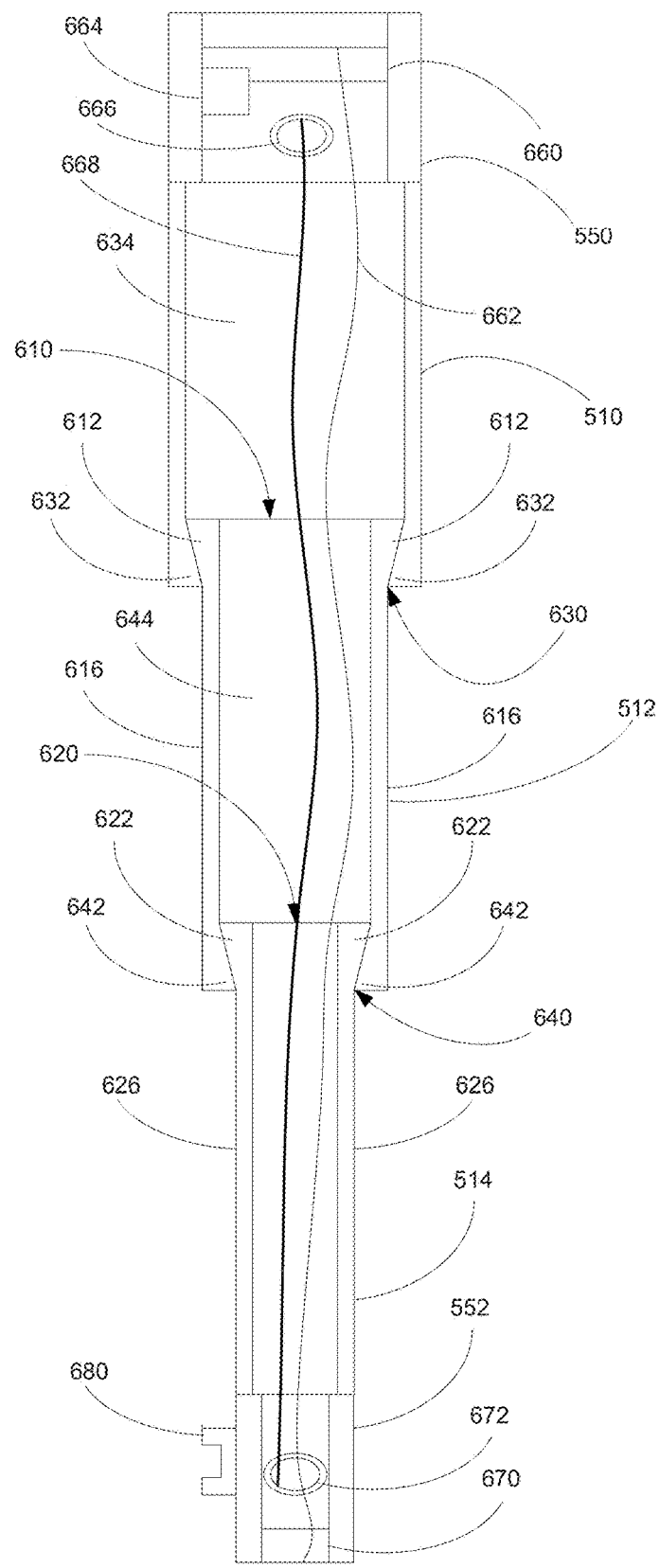
FIG. 6 is a cross-sectional view of a telescoping support structure in a fully deployed condition in accordance with aspects of the disclosure.
Figure 7:
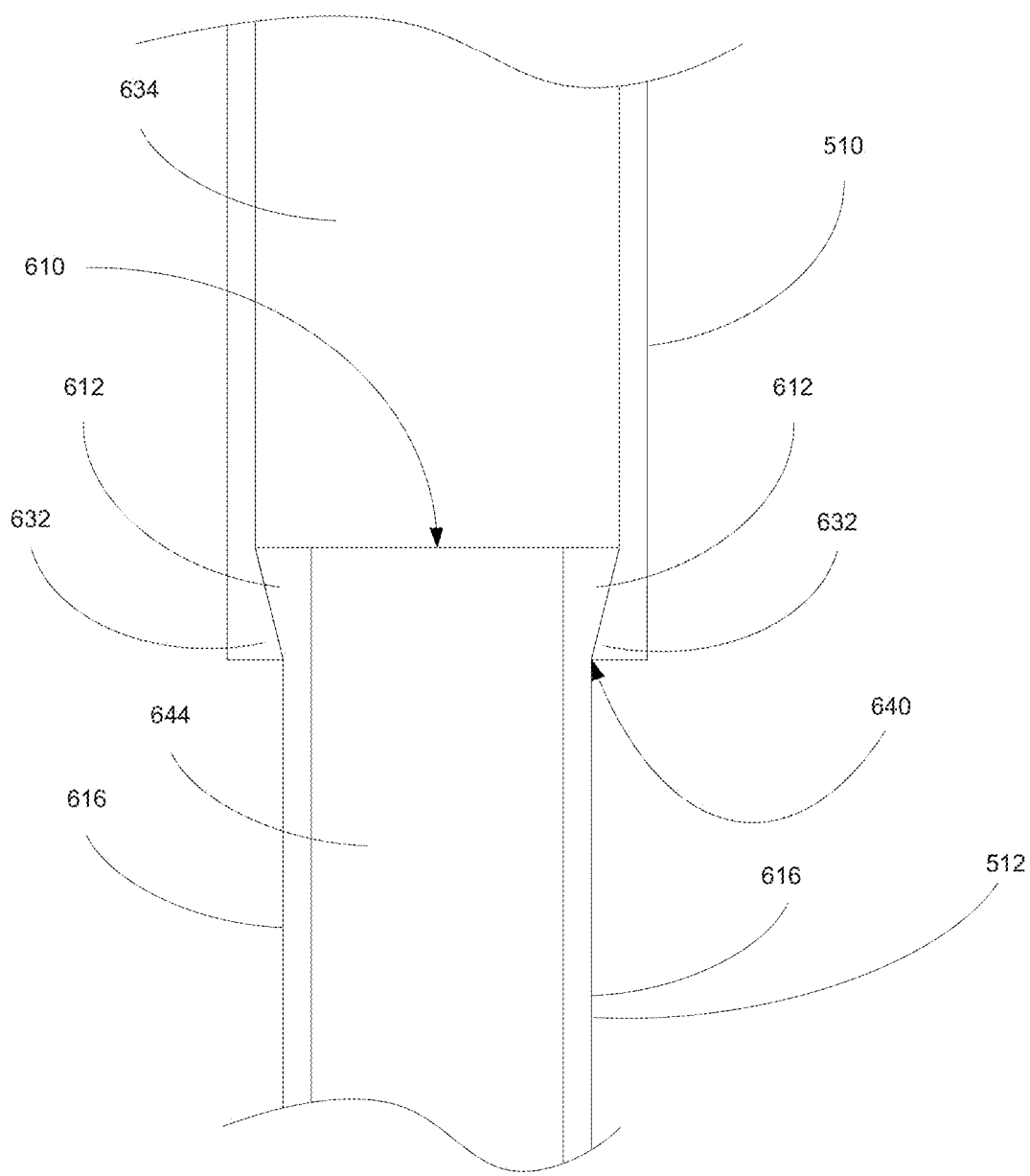
FIG. 7 is a detail view of a portion of a telescoping support structure in a fully deployed condition in accordance with aspects of the disclosure.
Figure 10:
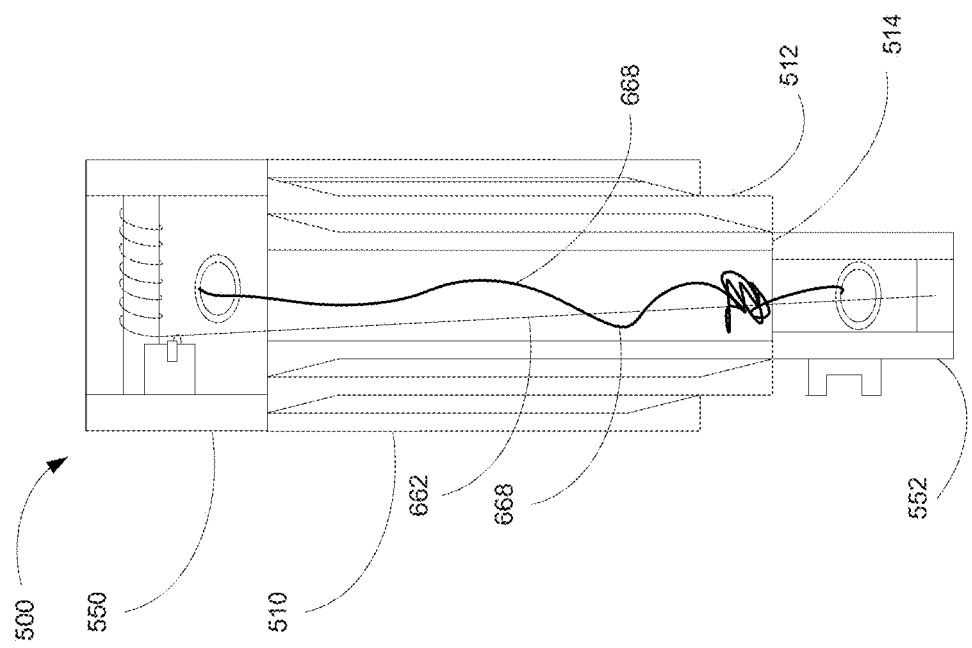
FIG. 10 is a cross-sectional view of a telescoping support structure in a stowed condition in accordance with aspects of the disclosure.
Figure 9:
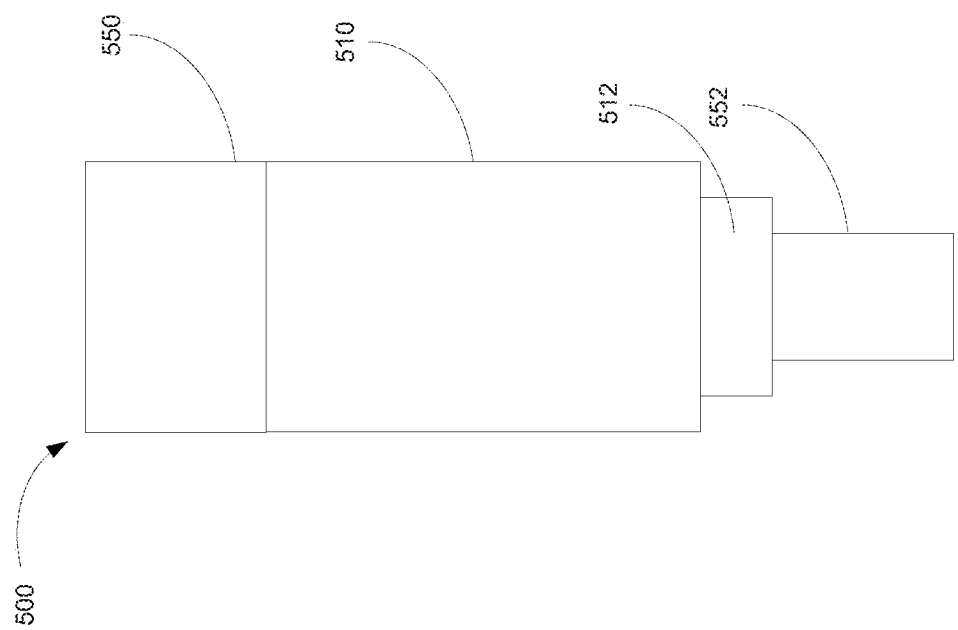
FIG. 9 is a perspective view of a telescoping support structure in a stowed condition in accordance with aspects of the disclosure.

FIGS. 5, 6, 7, and 10 provide different views of a telescoping support structure 500. Each of the example views of FIG. 5, FIG. 6, and FIG. 7 depict the telescoping support structure in a fully deployed condition. The perspective view of FIG. 9 and the cross-sectional view of FIG. 10 depict the telescoping support structure in a stowed condition where the tubes are at least partially nested within one another. Of course, the actual configuration in the stowed condition will depend upon the lengths and other characteristics of the individual tubular sections and terminal features as discussed further below.

Telescoping support structure may correspond to telescoping support structures 260, 460 discussed above, and may include a plurality of tubular sections 510, 512, 514 as shown in FIG. 5. Each tubular section may include an opening at one end which extends through the length of the tubular section to the opposite end. Although only 3 tubular sections are depicted, the number of tubular sections used may vary depending on the length of the individual sections as well as the desired length of the telescoping support structure when fully extended or deployed.

Of course, depending on where and how the telescoping support structure is used, the length of the telescoping support structure when fully deployed may differ. For instance, the telescoping support structure 260 may range from 2 to 8 meters or more or less, whereas the telescoping support structure 460 may be 8 meters or more or less to accommodate the solar panels 430 when arranged between the upper payload structure 410 and the lower payload structure 420. These values may be selected based upon the size of the payload 220 or 400, the balloon envelope 210, as well as the features required for the function of the balloon 200.

The telescoping support structure may be used to support the weight of a first object when extended below a second object. As noted above, in one example, the first object may correspond to the balloon envelope 210 and the second object may correspond to the payload 220 (or 400). In a second example, the first object may correspond to an upper payload structure 410 and the second object may correspond to a lower payload structure 420. In this regard, the plurality of tubular sections 510, 512, 514 must be of sufficient rigidity to support the weight of the lower object. As such, the plurality of tubular sections may include various materials such as metals including aluminum and aluminum alloys, carbon fiber, plastics, or combinations of these.

In order to provide the telescoping action of the tubular sections and allow adjacent tubular sections to engage with one another, each intermediate tubular section and one of the terminal tubular sections may have a first end that is at least some degree wider than a second end. In addition, the openings of one tubular section at the first end must be wider than the first end of an adjacent tubular section to allow for easy assembly of the telescoping support structure. Similarly, the opening of one tubular section at the second end must be narrower than the first end of the adjacent tubular section to allow for deployment. The closer these dimensions are to one another between adjacent tubular sections, the greater the number of tubular sections that can be stacked within one another in the stowed condition.

To achieve this, the first ends of the intermediate tubular sections and one of the terminal tubular sections may include a first projection and the second ends of the intermediate tubular sections and the other of the terminal tubular sections may include a second projection. These first and second projections may be configured to engage with one another in order to prevent the tubular sections from completely sliding through one another. For instance, as shown in FIG. 6, tubular section 512 includes a first end 610 having a first projection 612. Similarly, tubular section 514 includes a first end 620 having a first projection 622. These first projections 612, 622 may have an annular shape that extends 360 degrees around the exterior surfaces 616, 626 of the tubular sections 512, 514, respectively. In addition, tubular section 510 includes a second end 630 having a second projection 632. Similarly, tubular section 512 includes a second end 640 having a second projection 642. These second projections 632, 642 may have an annular shape that extends 360 degrees around the interior surfaces 634, 644 of the tubular sections 510, 512, respectively.

The first and second projections can extend directly from the interior or exterior surfaces of the respective tubular section, and in other words, be a part of the respective tubular section. Thus, the second projection may be made of the same material as the tubular section. While this may complicate manufacturing, it may make a second projection more stable within its respective tubular section.

Alternatively, rather than being an integral part of a tubular section, the first and second projections may be formed as a separate ring attached to the exterior surface of the tubular section. In the case of first or second projections being rings, a ring may be attached to a tubular section using glues or adhesives suitable for low temperatures such as various commercially available epoxies including, for instance, 3M™ Scotch-Weld™ Epoxy Adhesives 2216 B/A, DP420, DP460, etc. The rings may be formed from aluminum and aluminum alloys, carbon fiber, plastics, or combinations of these.

Of course, the materials selected for the rings and tubular sections may interact with one another in less than desirable ways when used in low temperature environments such as those expected in the stratosphere due to mismatched Coefficient of Thermal Expansion (CTE). For example, an interior ring made of a high CTE material such as Aluminum might pull away and detach from a tube made of low CTE material such as Carbon Fiber or Steel. To avoid this potential failure in the adhesive bond, materials with similar CTEs might be used.

The second projections may have various dimensions and configurations which may be dependent upon the dimensions of adjacent tubular sections within the telescoping support structure. FIG. 7 depicts a detail view of a portion of tubular section 512 and tubular section 514. As shown, each of the first and second projections may take the shape of a wedge. This wedge may be set at an angle, such as 45 degrees or more or less in order to create an engaging force between the second projection and an adjacent tubular section. This may actually provide a force multiplier on gravity and provide a higher friction between the wedge faces, increasing torsional stiffness between the second projection and the adjacent tubular support.

Again, as noted above, the actual dimensions of the first and second projections may be selected based upon the interior diameter of the corresponding tubular support structure for that second projection, as well as the exterior diameter of the adjacent tubular support structure. For instance, the width of the first and second projections may be no more than $1/10$ of an inch or more or less. In other words, the first projection 612 may project from the exterior surface 616 no more than $1/10$ of an inch or more or less, and the second projection 632 may project from the interior surface 634 no more than $1/10$ of an inch or more or less. The depth of the projection will be primarily driven by the weight of the suspended load.

Figure 8:
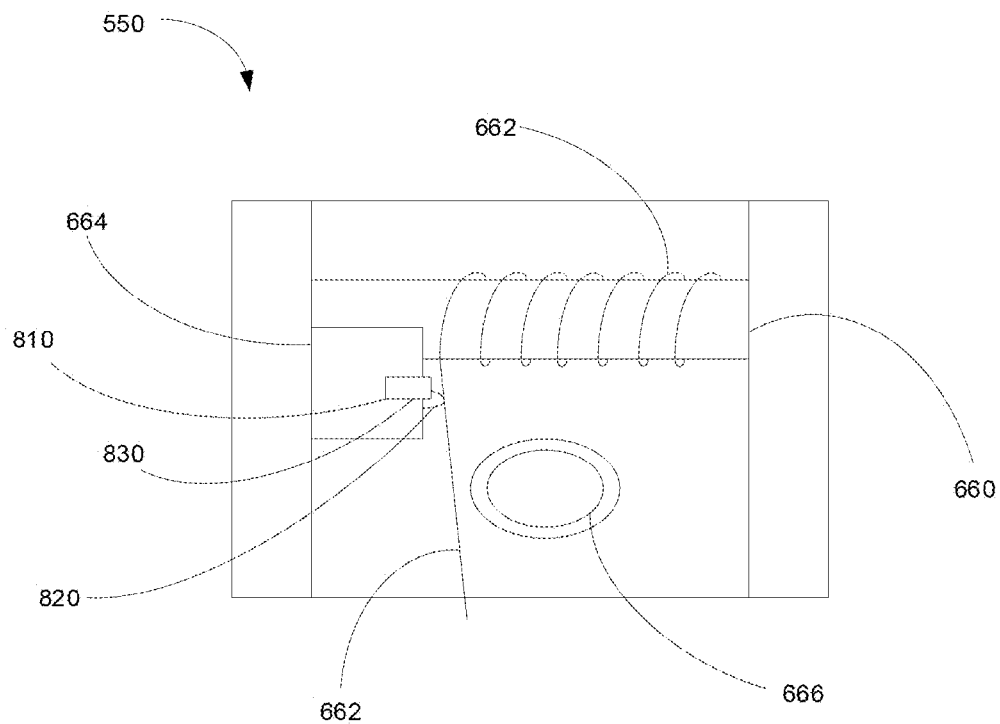
FIG. 8 is a detail view of a terminal feature in accordance with aspects of the disclosure.

The terminal ends of the telescoping support structure may each include a terminal feature. For instance, returning to FIG. 6, telescoping support structure 500 may include terminal features 550 and 552. Terminal feature 550 may include a spool 660 with attached cable 662, a restraint device 810 (depicted in FIG. 8), a damper mechanism 664, and an opening 666 for passing electrical and/or power cables 668 through the interior of the telescoping support structure (not shown). The terminal feature 552 may include a connection 670 for attaching the cable 662 as well as an opening 672 for passing electrical and/or power cable 668 through the interior of the telescoping support structure. In this regard, the cable 662 extends between the spool 660 and the connection 670. The connection 670 may include a slot or other feature rated for the expected loads on the telescoping support structure. Depending upon the configuration of the telescoping support structure, the electrical and/or power cable 668 may provide power and data transfer between the upper and lower payload structures or between the balloon envelope 210 (for instance, at the base plate system 214) and the payload 220. The terminal feature 552 may also include an attachment feature such as a bracket 680 for attaching a safety tether for connecting the payload and the balloon envelope in the event of a flight termination.

The terminal features may each be formed from various materials such as carbon fiber, metals, plastics, or any combination of these. For instance, the terminal features may be formed by injection molding or 3D printing and attached via adhesives (such as the epoxies discussed herein), rivets, threaded fasteners, etc.

In this example, the wider tubular sections and the terminal feature 550 including the spool are located at the "top" or higher end of the tubular support structure. While the tubular support structure and/or the terminal features 550 and 552 may be inverted, the example of orientation and configuration FIG. 5 may be most effective for counteracting dynamic bending moments that may be experienced by telescoping tubular support structure when the balloon 200 changing directions or otherwise moving around in flight.

As noted above, the openings 666 and 672 may allow for an electrical and/or power cable to be run through the telescoping support structure. Of course, if most of the length of the electrical and/or power cable will be stored within the telescoping support structure in the stowed condition as shown in FIG. 10, the interior dimensions of the narrowest tubular support structure must be sufficient that when the telescoping support structure is in the fully deployed condition, there is sufficient slack in the electrical and/or power cable 668 to extend within the entire length of the fully extended telescoping support structure. Accordingly, the electrical and/or power cable 668 is depicted as bunched up to fit within the telescoping support structure 500.

The damper mechanism may allow the cable to be unrolled by the spool at a controlled rate when the telescoping support structure is initially deployed. For instance, the damper mechanism 664 may include a passive damper which produces torque in response to rotational velocity of the spool. This allows the telescoping system to deploy in a controlled manner, rather than a free-fall if there were no damper or other speed-governing device. In other words, the damper may resist motion when the spool is moving such that there is very little or no torque when the spool is stationary.

The restraint device may prevent the spool from unspooling the cable prior to a desired point in time. For instance, as shown in the detail view of terminal feature 550 in FIG. 8, the restraint device 810 may include a wire 820 which prevents the spool from releasing the cable (or at least releasing too much of the cable). The restraint device 810 may also include an activation device 830, such as a squib, razor, pyrotechnic, solenoid or other device that can be used to cut the wire in order to allow the spool to release the cable. The activation device may be operated manually by a human operator directly activating the squib or sending a wired or wireless signal to the activation device, or automatically, for instance by the computing system of the payload 220 or 400 once the balloon has reached a particular height as determined by a sensor such as an altimeter of the altitude control system.

In some examples, it may be useful to allow for some degree of freedom between the tubular sections and within the telescoping support structure. This may allow the telescoping support structure to absorb at least some bending stresses between the first object and the second object rather than simply transferring the stress between the first and second objects like a beam. In one example, one, more than one, or all of the intermediate tubular sections may include one or more flexure sections. For instance, tubular section 512 includes a flexure section 520. The flexure section 520 may be arranged away from connection areas between adjacent tubular sections to allow for optimal function of the flexure sections, but may also be arranged proximate to the adjacent tubular sections.

A flexure section may be configured in various ways. For instance, a flexure section may include a knuckle joint, a metallic flexure, a universal joint (similar to a vehicle axle), optical flexures (such as those used to mount mirrors and lenses within telescopes and other devices), etc. For a metallic flexure, pieces of the tubular sections may be removed, for instance cut away, to form a thin web which can deform to allow the tubular section to flex. The angles within this web may determine how far the web is able to flex before the tubular section actually breaks. (such as the epoxies discussed herein)

Figure 11:
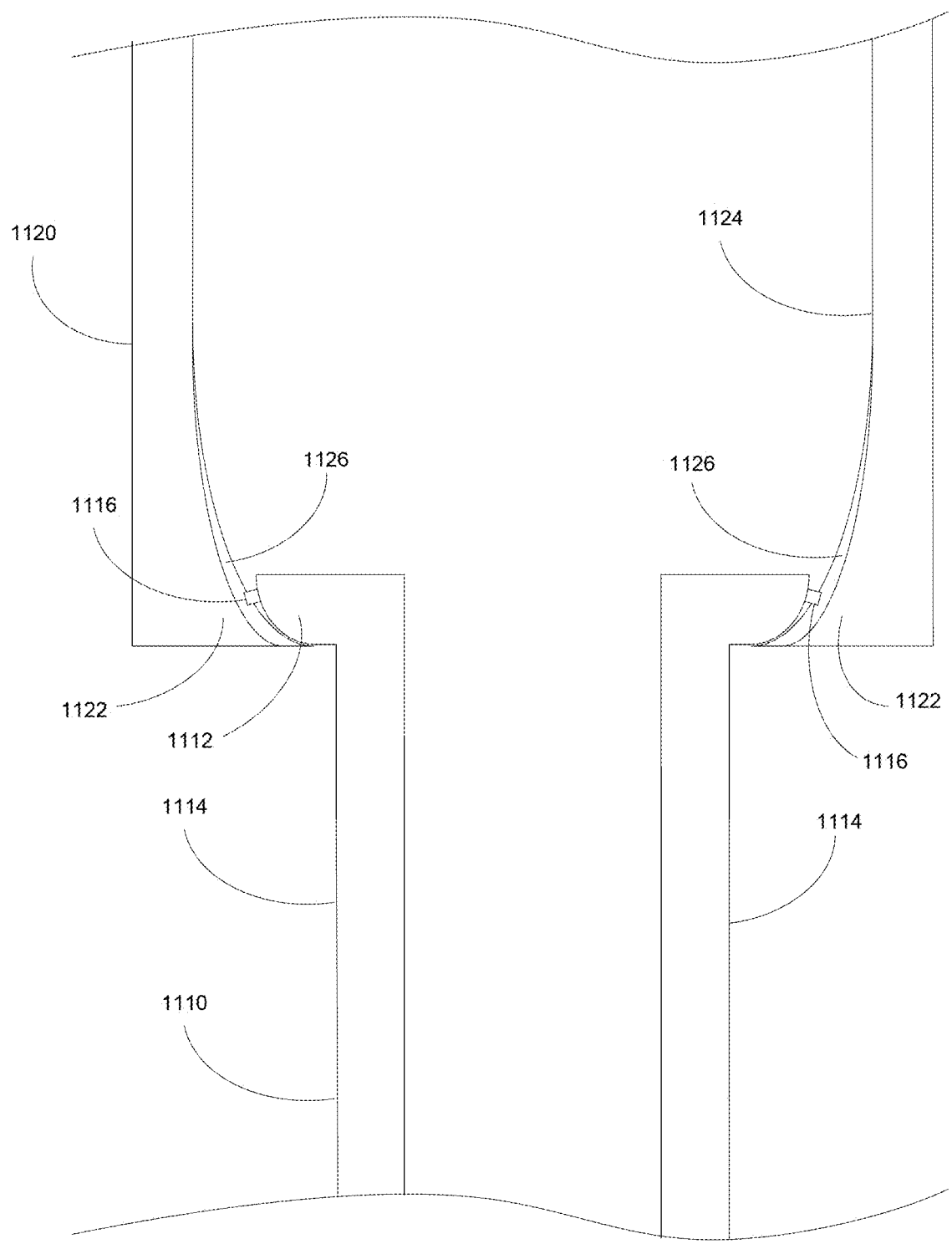
FIG. 11 is a detail view of a portion of a telescoping support structure in a fully deployed condition in accordance with aspects of the disclosure.

In addition or as an alternative to a flexure section, the second projection may have an at least partially spherical or rounded shape as opposed to the wedge shape of the above examples. FIG. 11 depicts tubular sections 1110 and 1120 which may be included in a telescoping support structure such as telescoping support structure. Tubular sections 1110 and 1120 may be an adjacent pair of tubular sections, similar to tubular sections 510 and 512 or tubular sections 512 and 514 or may be a pair of intermediate tubular sections. Tubular section 1110 includes a first projection 1112 attached or integral to (as in the examples above) an exterior surface 1114 of the tubular section 1110. This first projection 1112 has a convex rounded shape. Tubular section 1120 includes a second projection 1122 attached or integral to (as in the examples above) an interior surface 1124 of the tubular section 1120. The second projection 1122 has a concave rounded shape which is complementary to the convex rounded shape of the first projection 1112. As with the example above, the second projection 1122 may interfere with the first projection 1112 in order to prevent the tubular sections 1110 and 1120 from passing through one another.

The rounded shapes of the first projection 1112 and of the second projection 1122 may allow for some degree of rocking movement of the second projection within the interior of the adjacent tubular section. Like the flexure section, this rocking movement may allow the telescoping support structure 500 to absorb some of the bending stresses. Of course, this configuration may require more space within the adjacent tubular section in order to allow the ball to move within the adjacent tubular section as well as a corresponding rounded shape of the second projection. This may affect the number and size of the tubular sections used.

It may be important to control rotation between the first object and the second object. The balloon 200 has a tendency to randomly rotate but it is desirable to maintain orientation of the solar panels 270 or 430 relative to the sun. To enhance controllability, the telescoping structure may be torsionally stiff so that a rotation control device which may control the rotation of various features of the balloon 200, such as the solar panels, has a rigid structure against which to apply torque. To provide torsional stiffness the second projection may include one or more grooves. In addition, the first projection may include one or more teeth. For instance, first projection 1112 includes teeth 1116, while the second projection 1122 includes grooves 1126. When aligned with the grooves 1126, the teeth 1116 may slide back and forth within the grooves. Of course, the grooves may alternatively be located at the first projection and the teeth at the second projection. The teeth and grooves may therefore prevent the first projection from rotating while still allowing the first projection to move and absorb bending stresses.

In addition, in some instances, one or more of the tubular sections may be fitted with a structure which may allow objects to be mounted to the tubular sections. To allow for ease of assembly, the structure may be mounted to a tubular section after the tubes have been inserted into one another as discussed further below. As an example, the structure may include a launch interface which allows the balloon to be positioned prior to and during launch of the balloon. For instance, the launch interface may be grasped by a holding device during inflation of the balloon envelope and released after the balloon envelope reaches a desired height or inflation. Alternatively, if components were required to be distributed down the length of the telescoping tubes, such as solar panels, such components could be mounted to the section of each tube which protrudes in the compacted state. These components could be mounted to the exposed tube section via adhesives (such as the epoxies discussed herein), rivets, threaded fasteners, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 12:
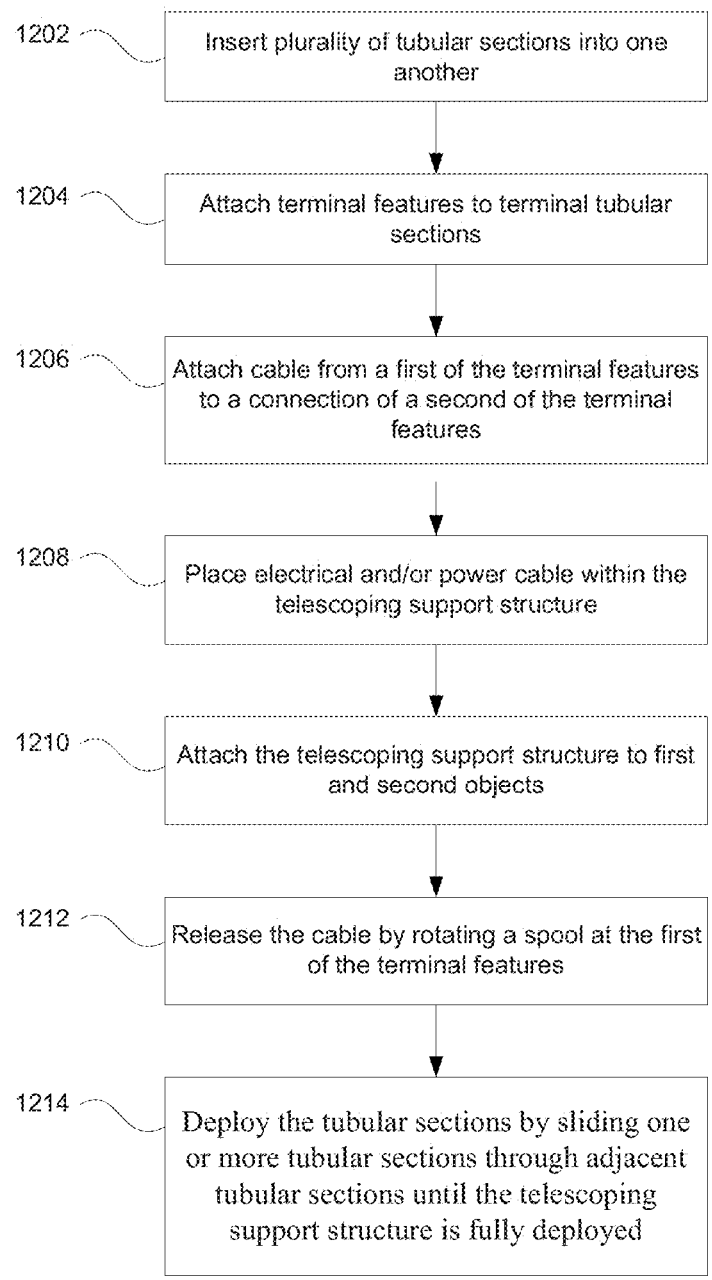
FIG. 12 is a flow diagram in accordance with aspects of the disclosure.

FIG. 12 is an example flow diagram 1200 including aspects of assembly and deployment of the telescoping support structure. In order to assemble the telescoping support structure, a plurality of tubular sections are inserted into one another at block 1202. For instance, this process may start with the tubular section 512 being inserted into the tubular section 510. Thereafter, tubular section 514 may be inserted into the tubular section 512 such that the tubular sections are nested within one another in the stowed configuration. As shown in block 1204, the terminal features are attached to the ends of the terminal tubular sections. For instance, the terminal feature 550 may be attached to the first end of the tubular section 510 and the terminal feature 552 may be attached to the second end of tubular section 512. At block 1206, cable from one of the terminal features is attached to a connection of another of terminal features. For instance, the cable 662 may also be extended from the spool 660 and attached to the connection 670. Any additional structures, such as the launch projection discussed above, may also be attached to the telescoping support structure.

Once the telescoping support structure is assembled, electrical and/or power cable is placed within the telescoping support structure at block 1208. For instance, the electrical and/or power cable 668 may be threaded through the openings 666, 672 of each of the terminal features. This may allow the electrical and/or power cable to be at least partially stowed with the telescoping support structure in the stowed configuration. The electrical and/or power cable may also be attached to corresponding attachment points at the balloon envelope (for instance, the base plate system 214) or payload 220 (for instance, at the upper payload structure 410 or lower payload structure 420) as needed.

As at block 1210, before or after placing and attaching the electrical and/or power cable, the telescoping support structure is attached to first and second objects. As noted above, this may include attaching the terminal feature 550 (or terminal feature 552 if inverted) to the base plate system 214 (if telescoping support structure is to be arranged between a balloon envelope and a payload) or upper payload structure 410 (if telescoping support structure is to be arranged between an upper payload structure and a lower payload structure) at a corresponding connection point. This may also include attaching the terminal feature 552 (or terminal feature 550 if inverted) to the payload 220 or upper payload structure 410 (if telescoping support structure is to be arranged between the balloon envelope and the payload) or the lower payload structure 412 (if telescoping support structure is to be arranged between the upper payload structure and lower payload structure). At this point, the telescoping support structure 500 is in the collapsed condition, and the balloon envelope 210 may be inflated with lighter than air lift gas. During inflation, the balloon 200 may be restrained by a weight, tether, or other restraint. Thereafter, the balloon 200 may be launched in any known manner, for instance, by releasing or removing the weight, tether, or other restraint. At the same time or once the balloon has reached a desired height, the telescoping support structure may be deployed.

In order to deploy the telescoping support structure, the cable is released by rotating a spool at one of the terminal features as at block 1212. The restraint device 810 may release the cable 662 from the spool 660. As an example, the activation device may be used to cut a wire which restrains the cable 662 on the spool. The activation device may be activated manually by a human operator at the activation device or remotely, or for instance by the computing system of the payload 220 or 400 once the balloon has reached a particular height as determined by a sensor such as an altimeter of the altitude control system. Once the wire is cut, the spool may release the cable 662. Gravity may begin to pull the tubular sections away from one another.

To keep the tubular sections from falling all at once due to gravity, the damper mechanism 664 may limit the movement of the spool 660 and accordingly the unrolling of the cable 662. At the same time, because the cable 662 is attached to the connection 670, the connection 670 in conjunction with the cable 662 and the damper mechanism 664 may cause the tubular sections to move more gradually starting from those at the lowest point in the stack until all of the tubular sections are deployed and the telescoping tubular section is fully deployed.

As at block 1214, the tubular sections will begin to deploy by sliding one or more tubular sections through adjacent tubular sections until the telescoping support structure is fully deployed. When arranged as shown in FIG. 5, the narrowest tubes will slide away from the larger tubes first. For instance, referring to FIG. 5, tubular section 514 may slide through tubular section 512 until the respective second and first projections come into engagement with one another and prevent the tubular section 514 from further passing through tubular section 512. Thereafter, tubular section 512 may slide through tubular section 510 until the respective second and first projections come into context with one another and prevent the tubular section 512 from further passing through tubular section 510. Of course, the tubular sections may be inserted into one another in various orders so long as the terminal features or too much friction do not interfere with the other tubular sections. At the same time, electrical and/or power cable 668 may also be extended within the telescoping support structure 500. Once all of the tubular sections are fully deployed, the telescoping support structure 500 is fully deployed (as shown in FIG. 5).

Alternatively, if the damper mechanism 664 is an active damper, rather than a passive damper as described above, the motor may cause the spool to release the cable only to a certain point and stop. This may limit the deployment of the tubular sections to a particular length. This may be useful in certain applications where the desired length of the telescoping support structure may change over time or be slightly less than the fully deployed length of the telescoping support structure, such as in systems which may have different flight or deployment stages or if there was reserve hardware that may or will be deployed at a later time.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of deploying a balloon system with a telescoping support structure, the method comprising:
while the telescoping support structure is in a collapsed configuration:
attaching a first terminal section of the telescoping support structure to a first portion of the balloon system,
attaching a second terminal section of the telescoping support structure to a second portion of the balloon system,
inflating a balloon envelope of the balloon system, and launching the balloon system into the air; and
extending the telescoping support structure when the balloon system reaches a first desired altitude; and
wherein the first portion of the balloon system is the balloon envelope and the second portion of the balloon system is a payload.

2. The method of claim 1, wherein, as a result of extending the telescoping support structure when the balloon system reaches a first desired altitude, the payload moves away from the balloon envelope.

3. The method of claim 1, wherein the first terminal section is nested at least partially within the second terminal section when the telescoping support structure is in a collapsed configuration.

4. The method of claim 1, wherein the telescoping support structure includes one or more intermediate sections, the one or more intermediate sections being arranged between the first terminal section and the second terminal section when the telescoping support structure is extended.

5. A method of deploying a balloon system with a telescoping support structure, the method comprising:
while the telescoping support structure is in a collapsed configuration:
attaching a first terminal section of the telescoping support structure to a first portion of the balloon system,
attaching a second terminal section of the telescoping support structure to a second portion of the balloon system,
inflating a balloon envelope of the balloon system, and launching the balloon system into the air;
extending the telescoping support structure when the balloon system reaches a first desired altitude; and
wherein the balloon system comprises an upper payload and a lower payload, the first portion of the balloon system is the upper payload, and the second portion of the balloon system is the lower payload.

6. The method of claim 5, wherein, as a result of extending the telescoping support structure when the balloon system reaches a first desired altitude, the lower payload moves away from the upper payload.

7. A method of deploying a balloon system with a telescoping support structure, the method comprising:
while the telescoping support structure is in a collapsed configuration:
attaching a first terminal section of the telescoping support structure to a first portion of the balloon system,
attaching a second terminal section of the telescoping support structure to a second portion of the balloon system,
inflating a balloon envelope of the balloon system, and launching the balloon system into the air;
extending the telescoping support structure when the balloon system reaches a first desired altitude;
wherein extending the telescoping support structure when the balloon system reaches a first desired altitude comprises extending a cable connected to the first terminal section and the second terminal section; and
wherein extending the cable connected to the first terminal section and the second terminal section comprises rotating a spool on which the cable is wrapped.

8. The method of claim 7, wherein the spool includes a wire configured to restrain at least some of the cable on the spool when the telescoping support structure is in a collapsed configuration; and extending the cable connected to the first terminal section and the second terminal section comprises severing the wire.

9. The method of claim 7, further comprising controlling a rate at which the telescoping support structure is extended using a damper mechanism.

10. The method of claim 9, wherein the damper mechanism comprises a passive damper which produces torque in response to rotation of the spool.

11. The method of claim 9, wherein the damper mechanism comprises an active damper which includes a motor.

12. The method of claim 11, wherein extending the telescoping support structure when the balloon system reaches a first desired altitude results in a partial extension of the telescoping support structure.

13. The method of claim 12, further comprising extending the telescoping support structure so that it is fully extended when the balloon system reaches a second desired altitude.

14. A method of deploying a balloon system with a telescoping support structure, the method comprising:
while the telescoping support structure is in a collapsed configuration:
attaching a first terminal section of the telescoping support structure to a first portion of the balloon system,
attaching a second terminal section of the telescoping support structure to a second portion of the balloon system,
inflating a balloon envelope of the balloon system, and launching the balloon system into the air;
extending the telescoping support structure when the balloon system reaches a first desired altitude; and
further comprising sending a signal to the balloon system, and wherein the step of extending the telescoping support structure when the balloon system reaches a first desired altitude is done in response to the balloon system receiving the signal.

15. The method of claim 14 wherein, as a result of extending the telescoping support structure when the balloon system reaches a first desired altitude, a payload carried by the balloon system moves away from the balloon envelope.

16. The method of claim 14 further comprising controlling a rate at which the telescoping support structure is extended using a damper mechanism.

17. A method of deploying a balloon system with a telescoping support structure, the method comprising:
while the telescoping support structure is in a collapsed configuration:
attaching a first terminal section of the telescoping support structure to a first portion of the balloon system, attaching a second terminal section of the telescoping support structure to a second portion of the balloon system,
inflating a balloon envelope of the balloon system, and launching the balloon system into the air;
extending the telescoping support structure when the balloon system reaches a first desired altitude; and
further comprising monitoring an altitude of balloon system with an altitude sensor, and wherein the step of extending the telescoping support structure when the balloon system reaches a first desired altitude is done in response to the altitude sensor indicating that the balloon system is at a desired altitude.

18. The method of claim 17 wherein, as a result of extending the telescoping support structure when the balloon system reaches a first desired altitude, a payload carried by the balloon system moves away from the balloon envelope.

* * * * *